(12) United States Patent
Uesaka

(10) Patent No.: US 8,641,095 B2
(45) Date of Patent: Feb. 4, 2014

(54) STEERING COLUMN DEVICE

(75) Inventor: Yota Uesaka, Toyohashi (JP)

(73) Assignee: Fuji Kiko Co., Ltd., Kosai-shi, Shizuoka-Ken (JP)

(*) Notice: Subject to any disclaimer, the term of this patent is extended or adjusted under 35 U.S.C. 154(b) by 293 days.

(21) Appl. No.: 13/033,634

(22) Filed: Feb. 24, 2011

(65) Prior Publication Data
US 2011/0210537 A1 Sep. 1, 2011

(30) Foreign Application Priority Data

Feb. 26, 2010 (JP) ................. P2010-042909

(51) Int. Cl.
B62D 1/18 (2006.01)
(52) U.S. Cl.
USPC ........................... 280/775; 74/493
(58) Field of Classification Search
USPC ............. 280/775, 777, 779; 74/492, 493, 495
See application file for complete search history.

(56) References Cited

U.S. PATENT DOCUMENTS

| | | | | |
|---|---|---|---|---|
| 5,743,150 | A * | 4/1998 | Fevre et al. | 74/493 |
| 6,282,977 | B1 * | 9/2001 | Satoh et al. | 74/493 |
| 7,350,814 | B2 * | 4/2008 | Hong et al. | 280/775 |
| 7,721,620 | B2 * | 5/2010 | Matsui et al. | 74/493 |
| 2004/0261565 | A1 * | 12/2004 | Uphaus et al. | 74/493 |
| 2007/0252372 | A1 | 11/2007 | Spano et al. | |
| 2009/0013817 | A1 * | 1/2009 | Schnitzer et al. | 74/493 |
| 2010/0219624 | A1 * | 9/2010 | Matsuno | 280/779 |

FOREIGN PATENT DOCUMENTS

| | | |
|---|---|---|
| DE | 102 17 534 A1 | 11/2003 |
| DE | 10 2004 051 060 B3 | 1/2006 |
| DE | 102005035009 B3 | 12/2006 |
| EP | 0849141 A1 | 6/1998 |
| EP | 2 223 842 A2 | 9/2010 |
| JP | 10-16707 A | 1/1998 |
| JP | 10-157634 A | 6/1998 |
| JP | 2005-506245 A | 3/2005 |
| JP | 2008-239085 A | 10/2008 |
| JP | 2009-83827 A | 4/2009 |
| WO | 2008/086548 A1 | 7/2008 |

OTHER PUBLICATIONS

Notification of Reasons for Refusal of corresponding Japanese patent application Jul. 9, 2013 from JPO with English abstract attached.

* cited by examiner

Primary Examiner — James English
(74) Attorney, Agent, or Firm — Nath, Goldberg & Meyer; Jerald L. Meyer

(57) ABSTRACT

A steering column device includes a fixed member and a movable member disposed between a jacket and a mount bracket. The fixed member is located on a mount bracket side, and the movable member is located on a jacket side. The fixed member and the movable member include a lock member and a lock tooth disposed to face each other. The lock member includes an elastic claw having elasticity to achieve engagement with and disengagement from the lock tooth.

4 Claims, 14 Drawing Sheets

STEERING COLUMN DEVICE

CROSS REFERENCE TO RELATED APPLICATION

This application is based upon and claims the benefit of priority from the prior Japanese Patent Application No. 2010-042909, filed on Feb. 26, 2010, the entire contents of which are incorporated herein by reference.

BACKGROUND OF THE INVENTION

1. Field of the Invention

The present invention relates to a steering column device provided with a jacket supporting a steering shaft rotatably.

2. Description of the Related Art

Published Japanese Translation of PCT International Publication No. 2005-506245, Japanese Unexamined Patent Application Publication No. Hei 10-157634, and European Patent Application Publication No. 0849141 disclose steering column devices of the related art, each of which includes a jacket supporting a steering shaft rotatably, a jacket guide configured to guide the jacket, and a lock mechanism configured to lock the jacket by tightening a clamp bolt.

As shown in FIG. 1, a steering column device 100 disclosed in Published Japanese Translation of PCT International Publication No. 2005-506245 includes a steering shaft 101 having an upper shaft 101a with an upper end in an axial direction to which a steering wheel (not shown) is to be fixed, and a lower shaft 101b fitted in the upper shaft 101a, a jacket 102 supporting the steering shaft 101 rotatably, a jacket bracket 103 fitted on the jacket 102, a jacket guide 104 disposed between the jacket bracket 103 and a mount bracket 107 and configured to guide the jacket bracket 103, and a lock mechanism 106 configured to fasten and fix the jacket bracket 103 and the jacket guide 104 to the mount bracket 107 by tightening a clamp bolt 105. A toothed rail member 109 is connected to the jacket bracket 103 by use of an energy absorbing device 108. The clamp bolt 105 supports a toothed member 110 which is provided on one end close to the jacket 102.

In the above-described configuration, when an unillustrated operating lever is rotated in a locking direction, the clamp bolt 105 is pulled downward in FIG. 1 by an action of the lock mechanism 106, whereby the jacket bracket 103 and the jacket guide 104 come into close and pressure contact with each other while the toothed member 110 is engaged with the toothed rail member 109. Accordingly, the jacket bracket 103 is locked to the jacket guide 104 in a telescopic direction. Meanwhile, the jacket guide 104 comes into pressure contact with the mount bracket 107 and is thereby locked in a tilt direction. Subsequently, when the operating lever is rotated in an unlocking direction, the state of pressure contact between the jacket bracket 103 and the jacket guide 104 is released through the clamp bolt 105 by an unlocking action of the lock mechanism 106, thereby releasing the locked state of the jacket bracket 103 with the jacket guide 104. Similarly, the state of pressure contact between the jacket guide 104 and the mount bracket 107 is also released, thereby releasing the locked state of the jacket guide 104 with the mount bracket 107. At the same time, the toothed member 110 is released from the state of engagement with the toothed rail member 109 and is biased by an unillustrated leaf spring in a direction away from the toothed rail member 109. In this way, it is possible to adjust a tilt position and a telescopic position of the steering shaft 101.

As shown in FIG. 2, a steering column device 120 disclosed in Japanese Unexamined Patent Application Publication No. Hei 10-157634 includes a steering shaft 121 with an upper end in an axial direction to which a steering wheel (not shown) is to be fixed, a jacket 122 supporting the steering shaft 121 rotatably, a guide member 123 configured to guide the jacket 122, and a lock mechanism 124 configured to lock the jacket 122 to the guide member 123. The lock mechanism 124 mainly includes paired gear portions 125 and 126 provided inside the jacket 122, a clamp member 128 provided with a bolt 127 having a head 127a coupled with the movable gear tooth portion 126 out of these gear tooth portions, and an operating lever 129 configured to move the clamp member 128. The bolt 127 is provided with a constricted part 127b located between the jacket 122 and the guide member 123.

In the above-described configuration, when the operating lever 129 is rotated in an unlocking direction, the bolt 127 moves toward the steering shaft 121 to release a state of engagement between the paired gear tooth portions 125 and 126 (shown disengaged). This release allows the jacket 122 to move in an axial direction. Meanwhile, when the operating lever 129 is rotated in a locking direction, the bolt 127 moves in a direction away from the steering shaft 121 and the paired gear tooth portions 125 and 126 are engaged with each other (shown disengaged). The engagement locks the jacket 122 to the guide member 123 and does not allow the jacket 122 to move in the axial direction. At this time, if an excessive impact in the axial direction larger than a predetermined value is applied to the jacket 122 via the steering shaft 121 by a driver bumping into the steering wheel due to a vehicle crash, for example, the bolt 127 receives a shearing force and breaks at the constricted part 127b. At this time, the head 127a of the bolt 127 breaks off to release the state of engagement between the paired tooth portions 125 and 126. This release allows, the jacket 122 to move in the axial direction and the steering shaft 121 contracts and absorbs the impact energy.

As shown in FIG. 3, a steering column device 130 disclosed in European Patent Application Publication No. 0849141 includes a mount bracket 132 having an elongated hole 131 extending in a tilt direction, a lock mechanism 134 configured to lock a jacket 133 to the mount bracket 132, and a block 137 located between the mount bracket 132 and an operating lever 135 of the lock mechanism 134 and provided with a round hole (not shown) into which a clamp bolt 136 is inserted. Here, paired gear tooth portions 138 and 139 to be engaged with each other are formed on the mount bracket 132 and on the block 137, respectively.

In the above-described configuration, when an operating lever 135 is rotated in a locking direction, the jacket 133 is pulled toward the mount bracket 132 by the clamp bolt 136 of the lock mechanism 134, whereby the movable gear tooth portion 139 on the block 137 is engaged with the fixed gear tooth portion 138 on the mount bracket 132 to lock the jacket 133 to the mount bracket 132. Subsequently, when the operating lever 135 is rotated in an unlocking direction, the pulled state of the clamp bolt 136 is released by the lock mechanism 134, whereby the clamp bolt 136 is allowed to move toward the jacket 133 to release the locked state of the jacket 133 to the mount bracket 132.

SUMMARY OF THE INVENTION

According to the technique disclosed in Published Japanese Translation of PCT International Publication No. 2005-506245, if the toothed rail member 109 and the toothed member 110 are turned into a so-called half-lock state by hitting their teeth each other at the time of a locking action, the jacket 102 cannot be fastened and fixed to the mount bracket 107, and moreover, a locking force itself is also reduced due to the interruption of the locking action. Meanwhile, in order to separate the toothed member 110 from the toothed rail member 109 at the time of the unlocking action, the clamp bolt 105 needs to be moved in the axial direction by an amount longer than the heights of the teeth of these members 109 and 110. As a consequence, the clamp bolt 105 is more likely to rattle by being loosened in the unlocking action. Further, since the toothed rail member 109 and the toothed member 110 are formed of a sintered alloy and the like, the toothed rail member 109 and the toothed member 110 are inevitably thick in an axial direction of the clamp bolt 105 and thereby a large offset dimension is needed from a shaft center of the steering shaft 101 to the operating lever. Hence, the operating lever will face a layout restriction and also a disadvantage in light of strength.

The technique disclosed in Japanese Unexamined Patent Application Publication No. Hei 10-157634 and the technique disclosed in European Patent Application Publication No. 0849141 have the same problems as the problem of the technique disclosed in Published Japanese Translation of PCT International Publication No. 2005-506245.

An object of the present invention is to provide a steering column device capable of securely locking a movable member to a fixed member while allowing reduction in a thickness dimension in a vehicle width direction.

An aspect of the present invention is a steering column device comprising: a steering shaft having an upper end in an axial direction of the steering shaft for fixing a steering wheel; a jacket configured to support the steering shaft rotatably; a mount bracket including a fixation portion to be fixed to a vehicle body and a suspended portion hanging from the fixation portion; a clamp bolt including a shaft penetrating the mount bracket; a fixed member provided between the jacket and the mount bracket; and a movable member provided between the jacket and the fixed member, wherein any one of the fixed member and the movable member includes a lock tooth, the other one of the fixed member and the movable member includes a lock member disposed to face the lock tooth and having an elastic claw having elasticity to be engaged with and disengaged from the lock tooth, and actuation of the clamp bolt by operation of an operating lever makes the fixed member and the movable member brought into and released from pressure contact with each other to switch between a pressure contact state where the jacket and the mount bracket are in pressure contact with each other and a non-pressure contact state where the jacket and the mount bracket are not in pressure contact with each other.

According to this aspect, the elastic claw of the lock member is latched on the lock tooth by tightening the clamp bolt at the time of a locking action. Hence, it is possible to regulate movement of the movable member relative to the fixed member.

Moreover, in case of the so-called half-lock state caused by the elastic claw of the lock member contacting a lock tooth peak of the movable member at the time of the locking action, the elastic claw is deflected, and when a load is applied to the steering wheel in the locked state, the elastic claw of the lock member is latched on the lock tooth upon movement of the movable member. Hence, movement of the movable member relative to the fixed member is regulated. In this way, even in case of the so-called half-lock state, it is possible to continue the locking action to the end by deflection of the elastic claw of the lock member. Accordingly, the fixed member and the movable member come into pressure contact with each other and establish a locked state by friction. Moreover, if a driver bumps into the steering wheel and an impact in the axial direction is applied to the steering shaft, the elastic claw of the lock member is latched on the lock tooth by the movement of the movable member. As a consequence, it is possible to lock the movable member securely onto the fixed member, to eliminate collision of the clamp bolt on an end surface of a telescopic elongated hole on a slide plate, and thereby to protect the driver from application of a large impact.

It is also possible to obtain similar operation and effect to the above configuration by fitting the lock member on the movable member so as to allow the elastic claw to be latched on the fixed member.

The fixed member may include the lock member, the movable member may include the lock tooth, and the lock member may be a leaf spring having the elastic claw in a plurality each protruding obliquely from a base plate and arms configured to come into pressure contact with the movable member.

According to this configuration, the multiple elastic claws of the lock member are obliquely cut and bent from the base plate so as to be engaged with the movable member. Moreover, the multiple arms come into pressure contact with the movable member so as to bias the movable member. Accordingly, the base plate recedes from the movable member at the time of the unlocking action. Hence, it is possible to release the state of the elastic claws being latched on the lock tooth.

The movable member may include a jacket bracket integrally formed on an outer peripheral surface of the jacket, and a slide plate disposed between the jacket and the jacket bracket and having a telescopic elongated hole extending in an axial direction of the steering shaft for disposing the clamp bolt through the telescopic elongated hole, and the fixed member may include a jacket guide disposed between the jacket bracket and the mount bracket and configured to guide the jacket bracket.

According to this configuration, the elastic claw of the lock member to be fitted on a jacket guide (the fixed member) is latched on the lock tooth of the slide plate (the movable member) by tightening the clamp bolt at the time of the locking action. At this time, the elastic claw is deflected even if the elastic claw of the lock member contacts the lock tooth peak of the slide plate and causes the so-called half-lock state. Accordingly, it is possible to continue the locking action of the operating lever to the end.

Meanwhile, if a driver bumps into the steering wheel and an impact in the axial direction is applied to the steering shaft, the elastic claw of the lock member is latched on the slide plate as the slide plate moves. Hence, it is possible to regulate movement in a telescopic direction of the steering shaft reliably. Moreover, the slide plate can deviate from a predetermined position of the jacket bracket and move inside a disengagement groove without causing the clamp bolt to move to an end of the telescopic elongated hole on the slide plate. Accordingly, the steering shaft can move in the axial direction. Therefore, the clamp bolt will not contact the end surface of the telescopic elongated hole on the slide plate, and it is possible to protect the driver from application of a large impact.

The lock tooth and the elastic claw may be provided in a plurality, two rows of the lock teeth and two rows of the elastic claws may be formed along the telescopic elongated hole, and one row and the other row of any one of the lock teeth and the elastic claws may be displaced from each other in the axial direction of the steering shaft by an amount equal to half of the lock tooth.

According to this configuration, one row and the other row of either one of the lock teeth or the elastic claws are displaced from each other in an amount equivalent to a half of the lock tooth. Therefore, if the elastic claw of the lock member contacts the lock tooth peak of the slide plate and causes the so-called half-lock state, it is possible to latch the elastic claw of the lock member onto the slide plate by allowing the slide plate to move for a relatively short distance.

The jacket guide may have a pair of tapered first guide surfaces in two ends of the jacket guide in a vertical direction, the jacket bracket may have a pair of tapered second guide surfaces in two ends of the jacket bracket in the vertical direction, the lock member may be located between the jacket guide and the jacket bracket, and the pair of first guide surfaces and the pair of second guide surfaces may be in pressure contact with each other in the pressure contact state.

According to this configuration, the pairs of tapered guide surfaces are respectively provided on the two end surfaces in the vertical direction of the jacket guide and the jacket bracket and the fixed member and the movable member are located between the jacket guide and the jacket bracket. In this way, it is possible to allow reduction in a thickness dimension of the steering column device in the vehicle width direction.

DETAILED DESCRIPTION OF THE EMBODIMENT

Hereinafter, an embodiment of the present invention will be described below with reference to the accompanying drawings.

Figure 1:
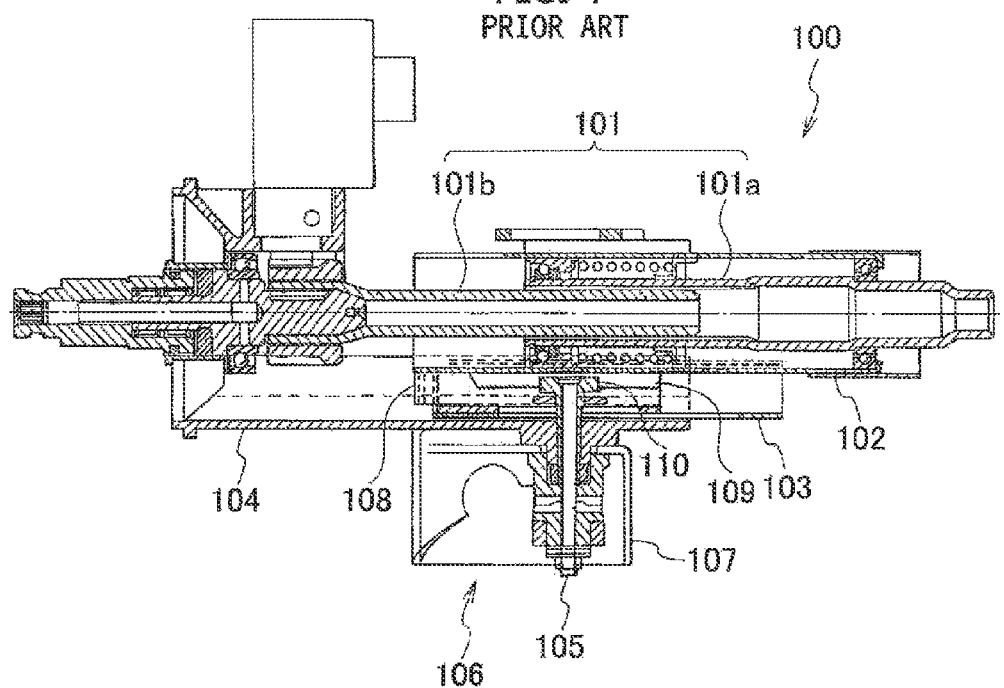
FIG. 1 is a cross-sectional view of a first steering column device of the related art.
Figure 2:
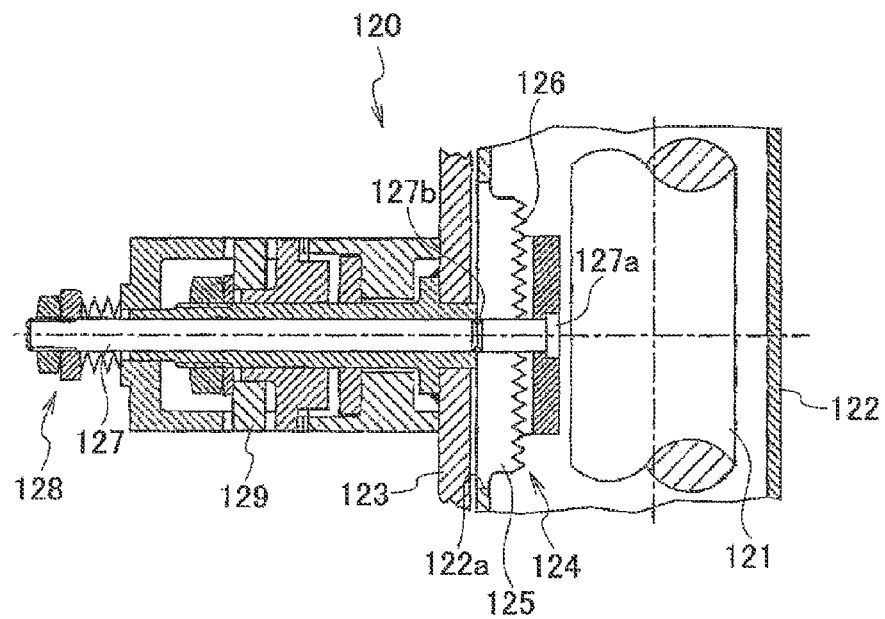
FIG. 2 is a cross-sectional view of a second steering column device of the related art.
Figure 3:
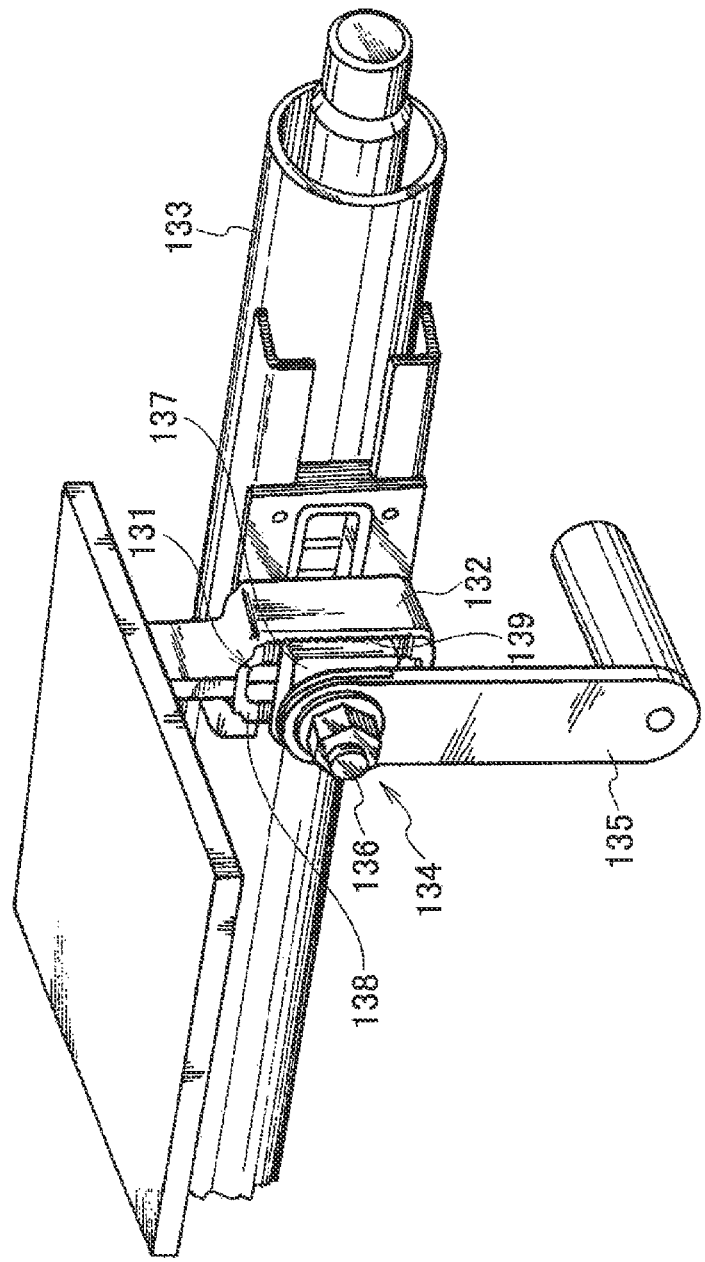
FIG. 3 is a perspective view of a third steering column device of the related art.
Figure 4:
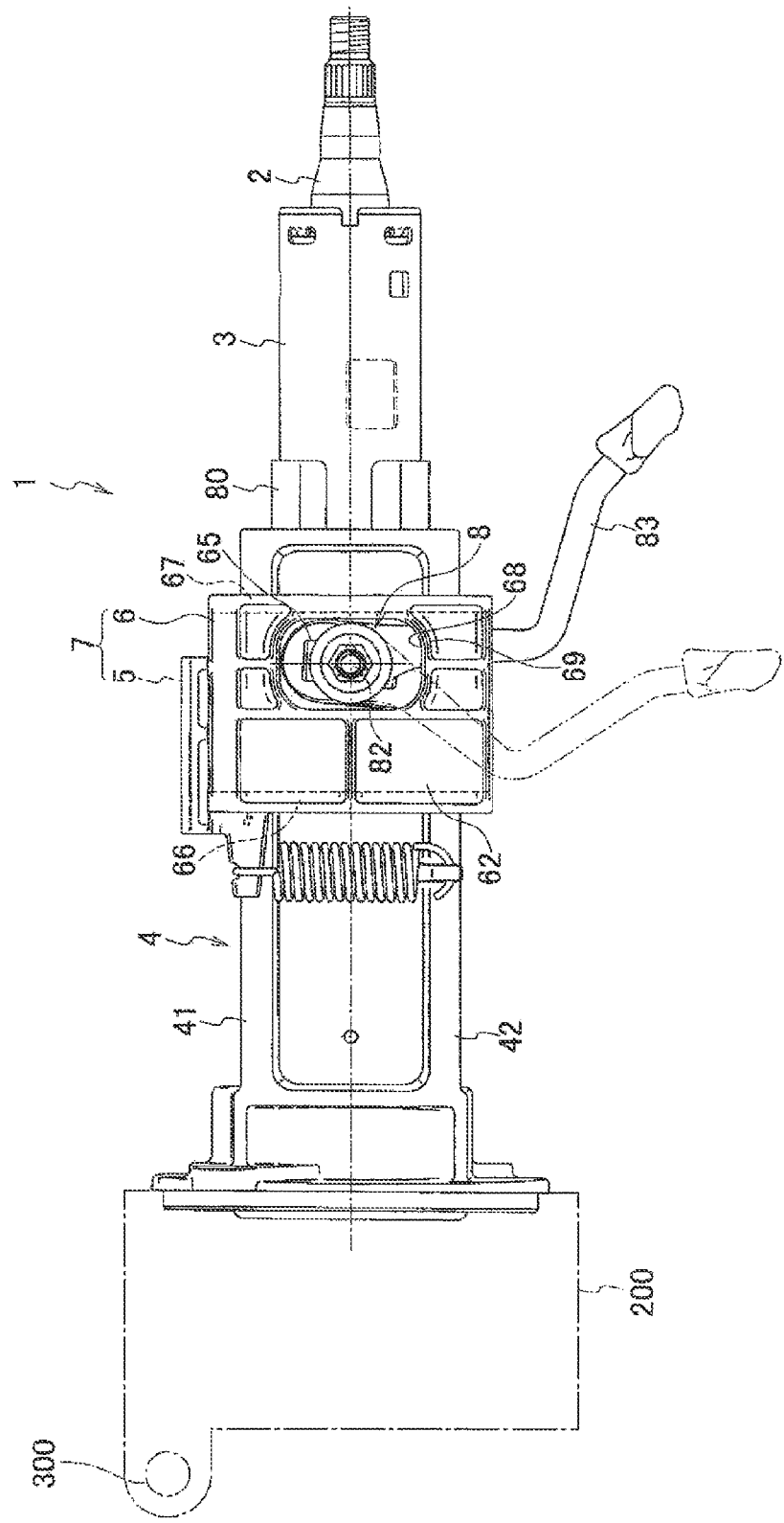
FIG. 4 is a front view of a steering column device according to an embodiment of the present invention.
Figure 5:
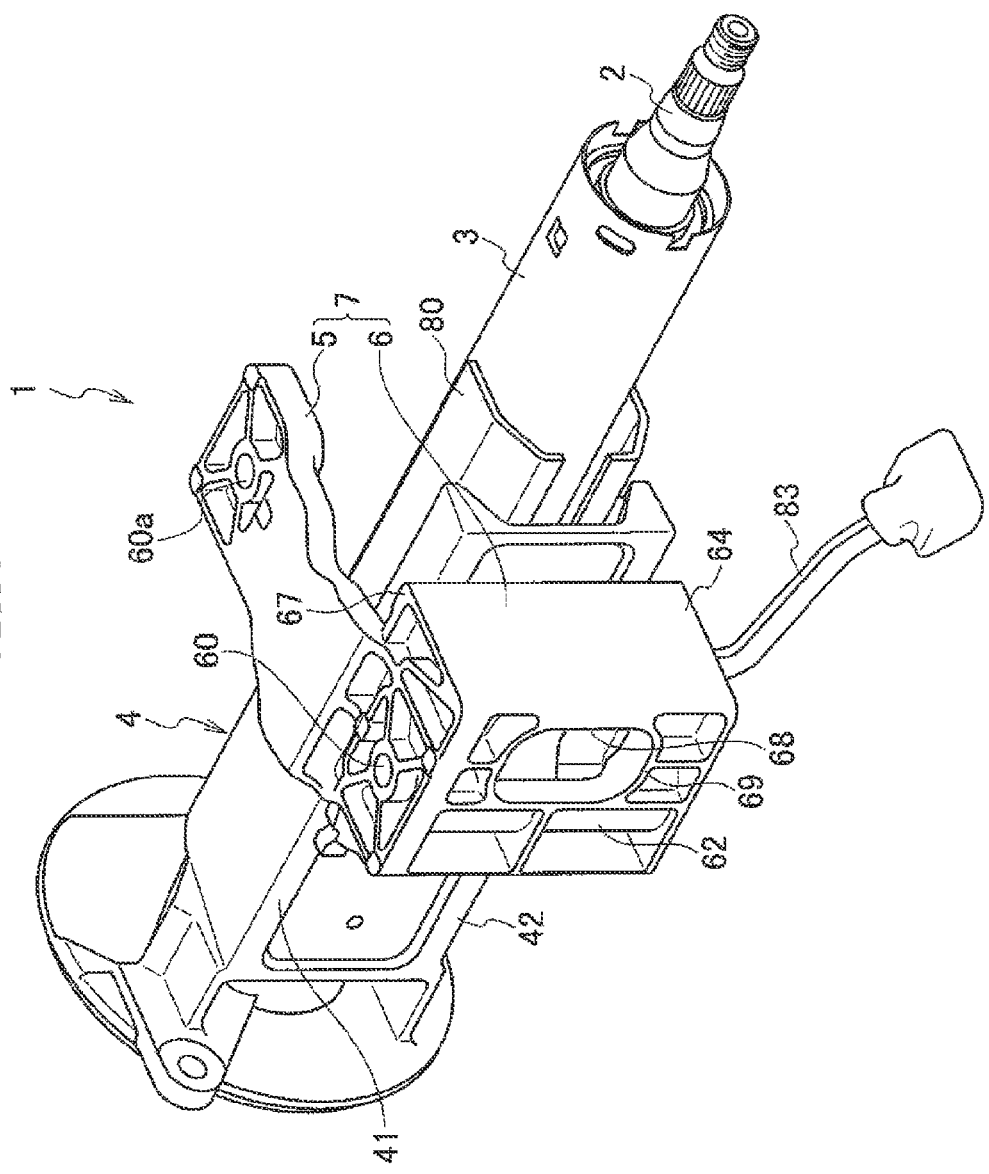
FIG. 5 is a perspective view of the steering column device according to the embodiment of the present invention.
Figure 6:
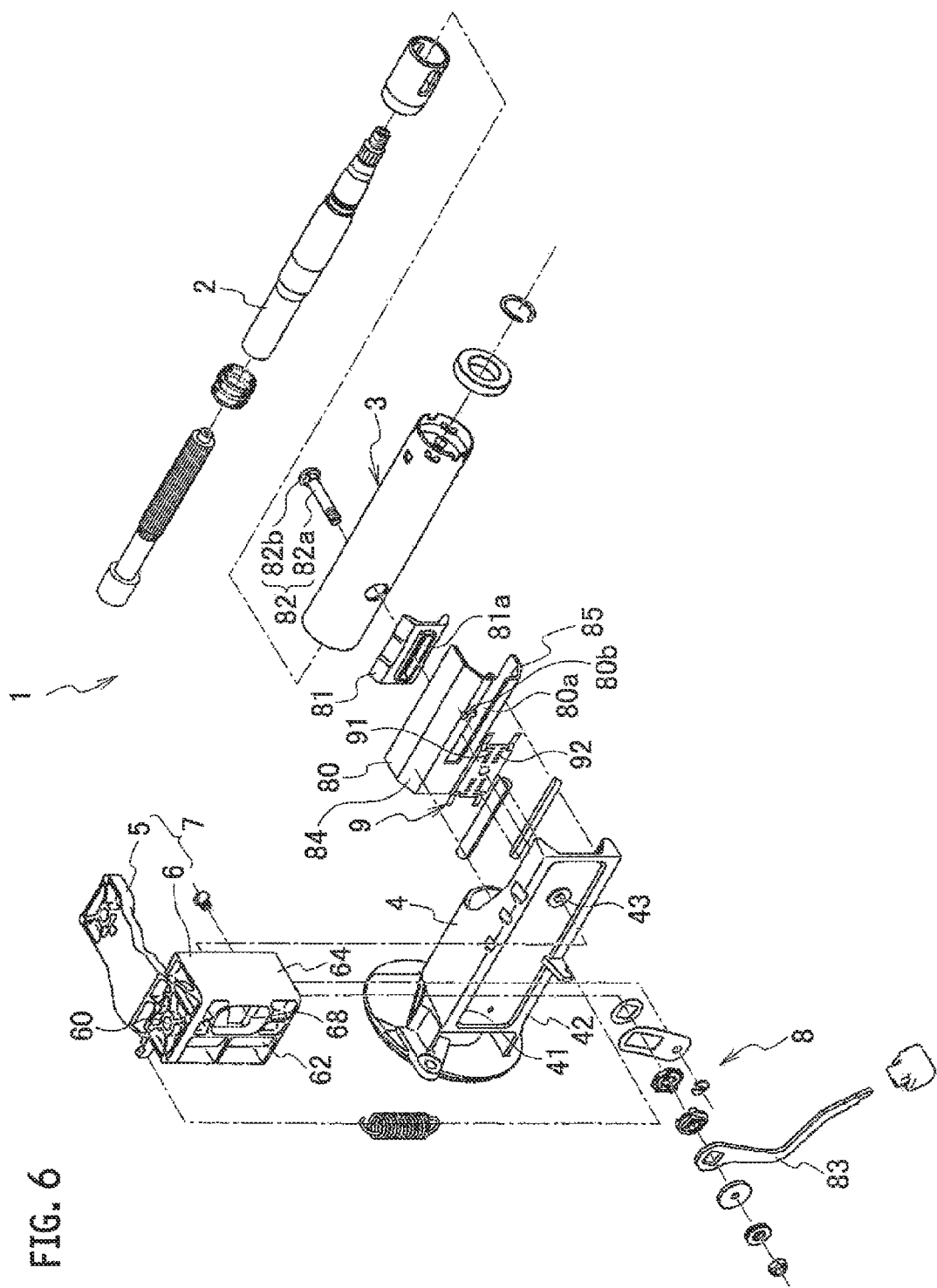
FIG. 6 is an exploded perspective view of the steering column device according to the embodiment of the present invention.
Figure 7:
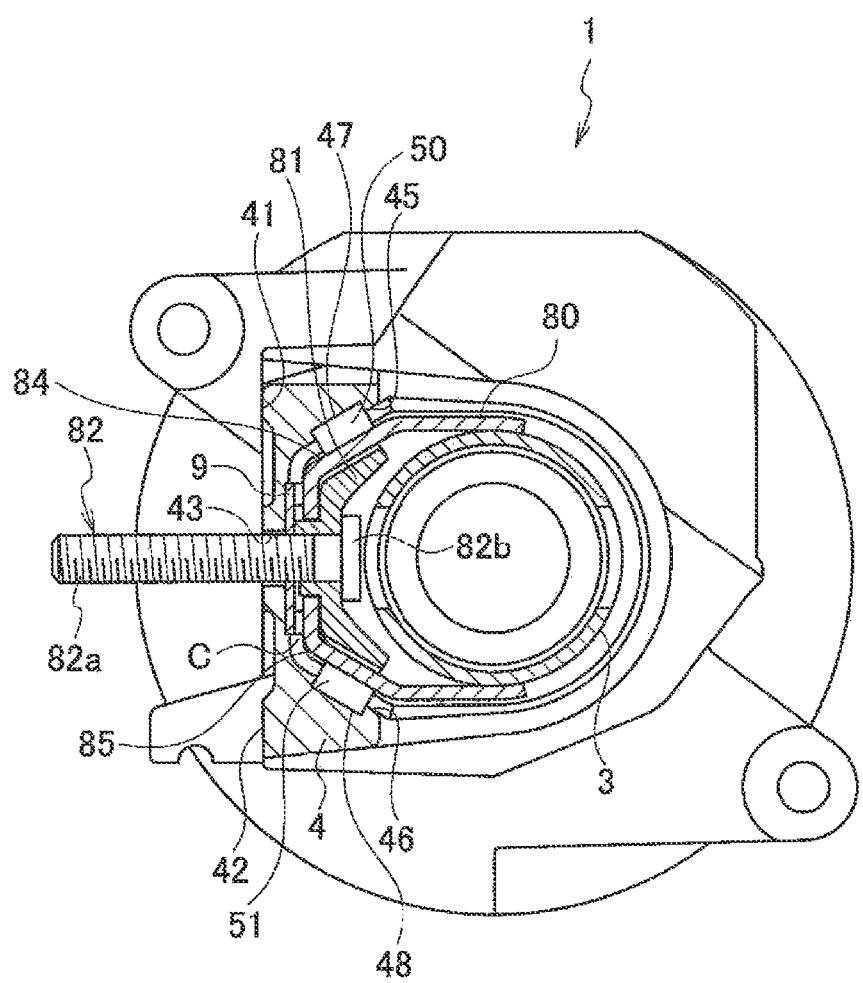
FIG. 7 is a cross-sectional view of a steering column device according to the embodiment of the present invention.
Figure 8:
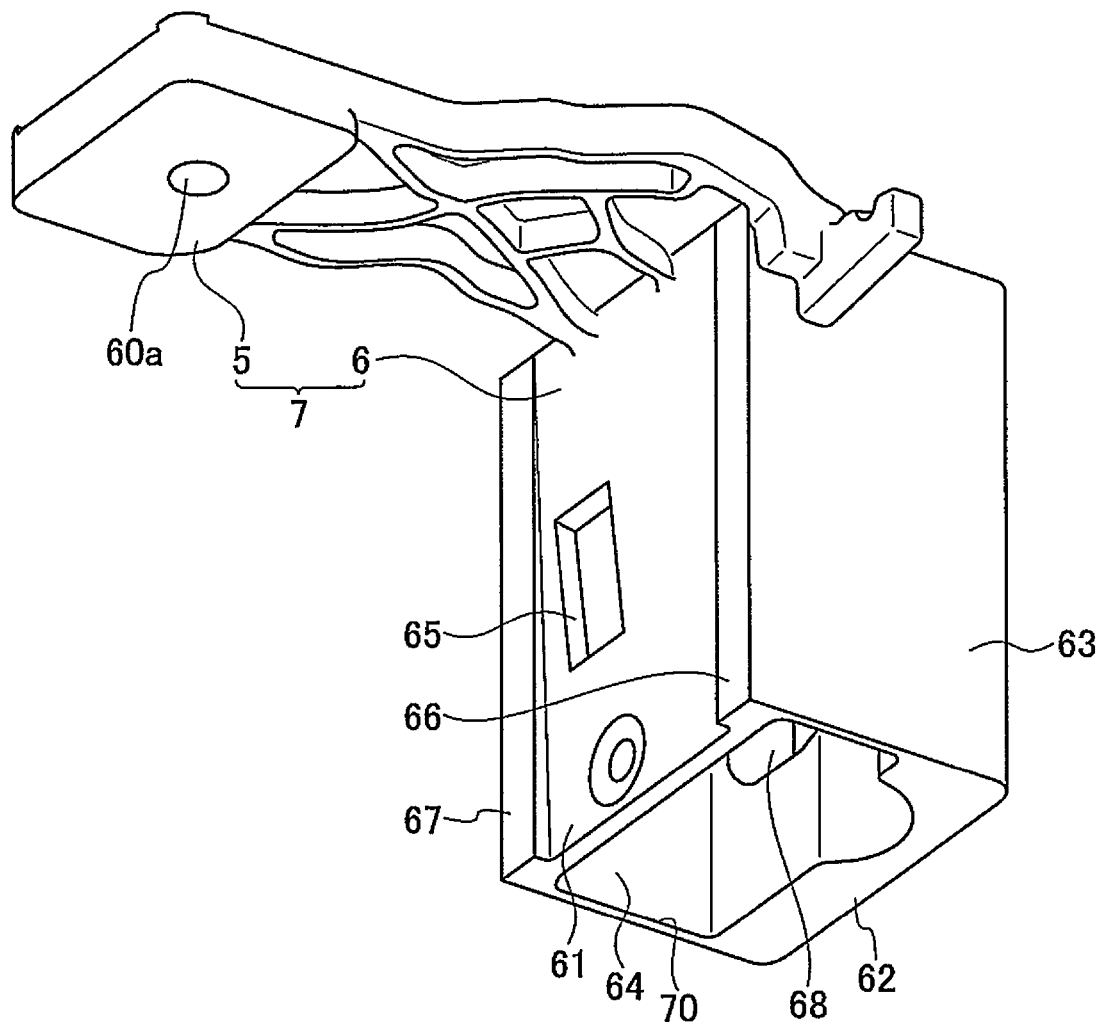
FIG. 8 is a perspective view of a mount bracket of the steering column device according to the embodiment of the present invention.
Figure 9:
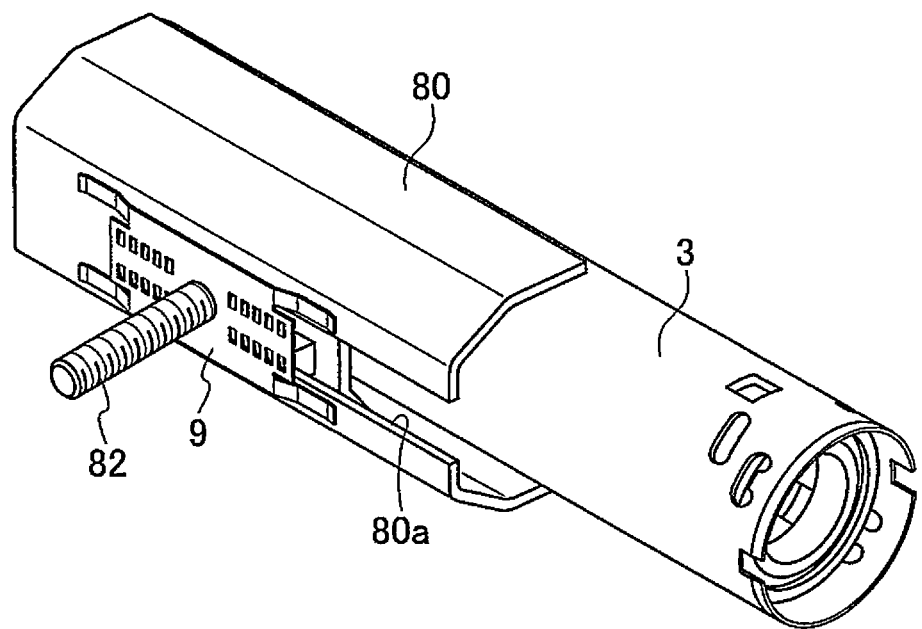
FIG. 9 is a perspective view of the steering column device according to the embodiment of the present invention, which shows a state of attaching a lock member to a jacket bracket.
Figure 10A:
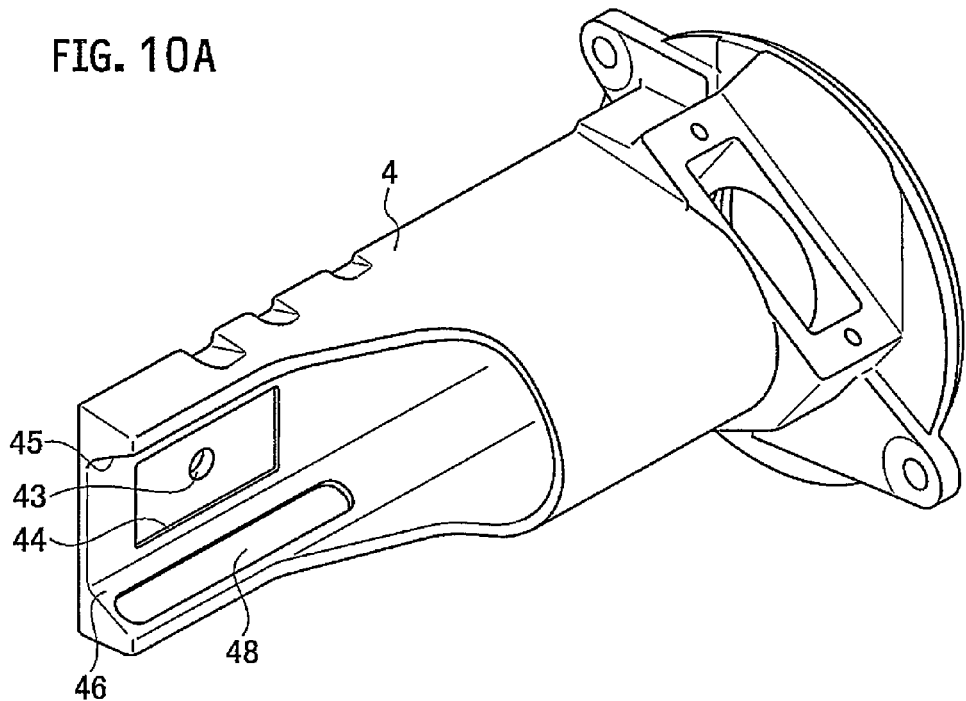
FIG. 10A is a perspective view of a jacket guide of the steering column device according to the embodiment of the present invention and FIG. 10B is a perspective view showing a state of fitting the lock member on the jacket guide of FIG. 10A.
Figure 10B:
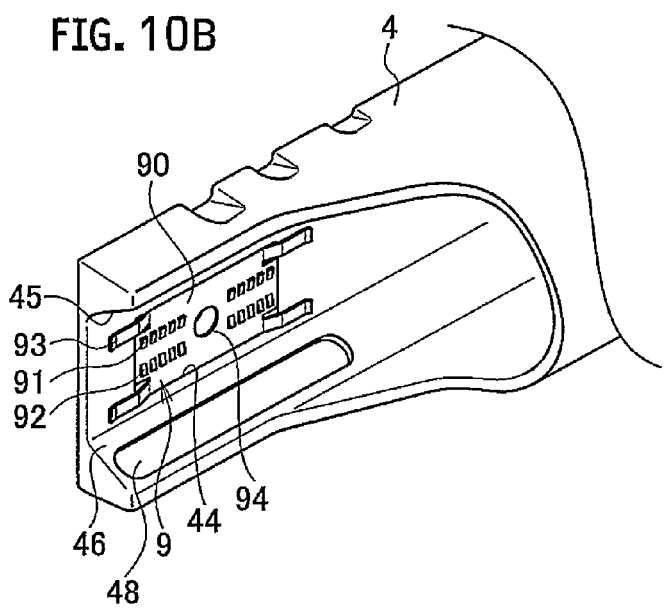
Figure 11:
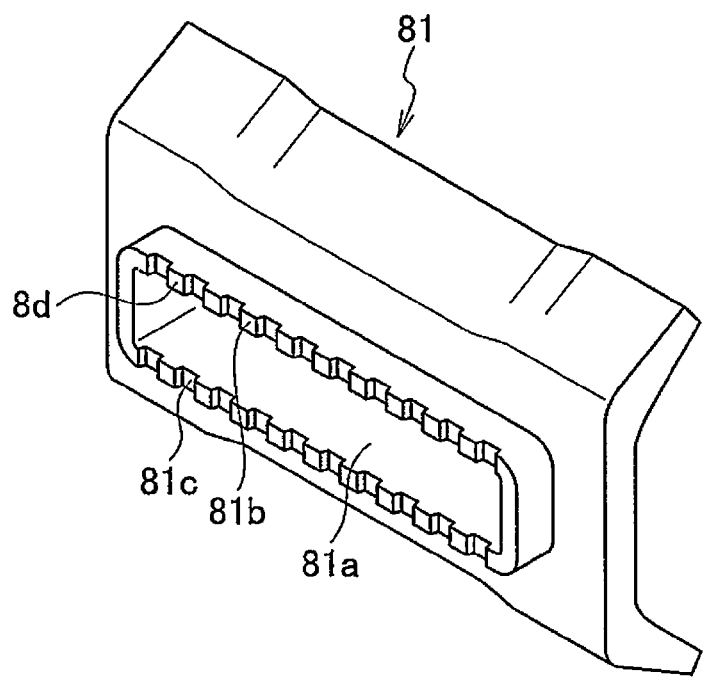
FIG. 11 is a perspective view of a slide plate of the steering column device according to the embodiment of the present invention, which is viewed from the jacket guide side.
Figure 12:
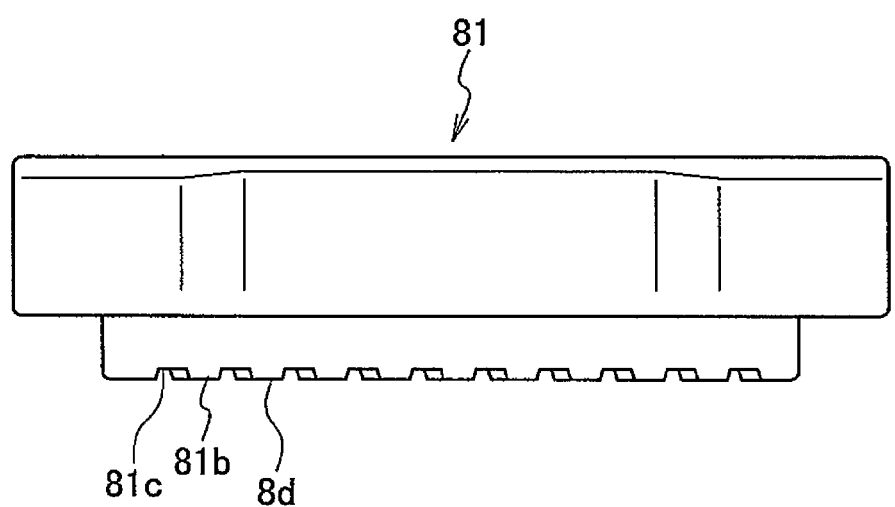
FIG. 12 is a plan view of the slide plate of the steering column device according to the embodiment of the present invention.

As shown in FIG. 4 to FIG. 19, a steering column device 1 of this embodiment includes a steering shaft 2 with an upper end in an axial direction to which a steering wheel (not shown) is to be fixed, a jacket 3 supporting the steering shaft 2 rotatably, a jacket guide 4 serving as a fixed member configured to guide the jacket 3, a mount bracket 7 having a fixation portion 5 to be fixed to a vehicle body (not shown) and a suspended portion 6 having a box shape and hanging from the fixation portion 5, a lock mechanism 8 configured to lock the jacket 3 to the mount bracket 7, and a lock member 9 to be fitted on the jacket guide 4. FIG. 7 is a cross-sectional view showing the steering column device 1 in a state of partially detaching the lock mechanism 8 and detaching the mount bracket 7.

The jacket guide 4 extends in an axial direction of the steering shaft 2 and the jacket 3. A lower end in a longitudinal direction of the jacket guide 4 is supported by a vehicle body via a tilt shaft 300 provided to an electric power steering unit 200. The lower end of the jacket guide 4 is formed into a noncircular tube. Meanwhile, an upper end thereof is formed substantially into a C-shape in which one side is open. In this way, the jacket guide 4 and the jacket 3 as a whole are rotatable around the tilt shaft 300. The jacket guide 4 includes paired upper and lower protrusions 41 and 42 which extend in the axial direction of the steering guide 2 and the jacket 3 and protrude from both ends in a lateral direction (a vertical direction in FIG. 4) of the jacket guide 4 toward the suspended portion 6. In a locking action, the paired upper and lower protrusions 41 and 42 axe allowed to contact paired front and rear protrusions 66 and 67 of the suspended portion 6 to be described later at four positions in total.

The jacket guide 4 has an insertion hole 43 to which a clamp bolt 82 to be described later is inserted, and a concave portion 44 into which the lock member 9 is fitted is formed on the jacket guide 4 on a side closer to the jacket 3. Paired tapered guide surfaces (first guide surfaces) 45 and 46 are provided on both ends of the jacket guide 4 in the vertical direction thereof, where a jacket bracket 80 to be described later is brought into pressure contact by tightening the clamp bolt 82. Fitting elongated holes 47 and 48 are formed between the tapered guide surfaces 45 and 46, and sheet members 50 and 51 having substantially the same shapes as the shapes of the fitting elongated holes 47 and 48 and being made of either metal or resin are fitted into the fitting elongated holes 47 and 48. The sheet members 50 and 51 are slidable on tapered guide surfaces (second guide surfaces) 84 and 85 of the jacket bracket 80 to be described later, while a space C is defined between the jacket guide 4 and the jacket bracket 80. Since the jacket guide 4 is formed by aluminum die-casting, the tapered surfaces of the guide surfaces 45 and 46 of the jacket guide 4 may not become parallel to the tapered guide surfaces 84 and 85 of the jacket bracket 80. Therefore, those surfaces are adjusted to be parallel to one another by providing the sheet members 50 and 51.

The mount bracket 7 includes the fixation portion 5 and the suspended portion 6 which are integrally formed by aluminum die-casting. The mount bracket 7 includes attachment holes 60 and 60a located at two positions on respective right and left sides in the vehicle width direction. The mount bracket 7 is attached to a vehicle body by use of the attachment holes 60 and 60a. The attachment hole 60 to which an attachment bolt (not shown) is inserted is provided on an upper part of the box-shaped suspended portion 6. The suspended portion 6 includes a first wall 61 being located adjacent to the jacket guide 4 and extending along the jacket guide 4, a second wall 62 being located outside the first wall 61 in the vehicle width direction and extending along the first wall 61, a front side wall (a joining portion) 63 which joins front ends of the first wall 61 and second wall 62 to one another, and a rear side wall (a joining portion) 64 which joins rear ends of the first wall 61 and second wall 62 to one another.

The first wall 61 includes an elongated hole 65 extending in a tilt direction of the steering shaft 2 and allowing insertion of a shaft 82a to be described later, and paired front and rear protrusions 66 and 67 being located on both sides of the elongated hole 65 in the vehicle anteroposterior direction, extending in the vehicle height direction, and protruding in a direction of the jacket guide 4. One of the front and rear protrusions 66 and the front side wall 63 are provided on a common plane which is perpendicular to the jacket guide 4. Similarly, another one of the front and rear protrusions 67 and the rear side wall 64 are also provided on another common plane which is perpendicular to the jacket guide 4. Therefore, steps are formed on both right and left ends of the first wall 61 by use of the front and back protrusions 66 and 67.

The second wall 62 includes an opening 68 opposed to the lock mechanism 8 and a reinforcing rib 69 is provided around the opening 68. A lever insertion hole 70, to which an operating lever 83 to be described later is rotatably inserted, is formed at a lower side of the suspended portion 6. The front side wall 63 and the rear side wall 64 are formed into flat surfaces.

The lock mechanism 8 includes the jacket bracket 80 serving as a movable member which is welded to the jacket 3 so as to extend in the axial direction of the jacket 3, a slide plate 81 serving as a movable member to be attached on the jacket 3 side of the jacket bracket 80, the clamp bolt 82 provided with the rotatably supported shaft 82a, and the operating lever 83 to activate the clamp bolt 82. The lock mechanism 8 is configured to fasten and fix the jacket 3 to the mount bracket 7 via the jacket guide 4 and the jacket bracket 80 by tightening the clamp bolt 82 by way of a rotating action of the operating lever 83.

The jacket bracket 80 includes a disengagement groove 80a extending in the axial direction of the steering shaft 2 and allowing disengageable attaching of the slide plate 81, and a latch 80b integrally formed with the disengagement groove 80a and configured to regulate movement of the slide plate 81. The slide plate 81 includes a telescopic elongated hole 81a extending in the axial direction of the steering shaft 2, and lock gear teeth 81b and 81c formed in two rows on a rim of the telescopic elongated hole 81a and being capable of locking elastic claws 91 and 92 to be described later. The lock gear teeth 81b and 81c are respectively formed along the telescopic elongated hole 81a at equal pitches. Moreover, positions of the upper lock gear teeth 81b are displaced and different from positions of the lower lock gear teeth 81c in a lateral direction in FIG. 12 and FIG. 13. Accordingly, the positions where the upper elastic claws 91 are locked by the upper gear lock teeth 81b are displaced from the positions where the lower elastic claws 92 are locked by the lower gear lock teeth 81c. Peaks of the upper lock gear teeth 81b and of the lower lock gear teeth 81c are formed into flat surfaces 8d.

The lock member 9 is formed of a leaf spring that includes the elastic claws 91 and 92, formed in two rows, each of which is a portion of a rectangular base plate 90 obliquely lifted up after the periphery of the portion is partially cut, and four arms 93 coming into pressure contact with the jacket bracket 80. An insertion hole 94 to which the clamp bolt 82 is inserted is formed at a central part of the base plate 90. The two rows of elastic claws 91 and 92 protrude toward the slide plate 81 so as to be capable of being latched on the gear lock teeth 81b and 81c on the slide plate 81. Moreover, the upper elastic claws 91 and the lower elastic claws 92 are disposed at similar positions in a lateral direction in FIG. 16, respectively. The four arms 93 protrude outward from positions near four corners on the base plate 90 and are bent toward the jacket bracket 80.

The clamp bolt 82 includes the shaft 82a and a head 82b. The shaft 82a is inserted from a right side of FIG. 7 into the telescopic elongated hole 81a in the slide plate 81, the insertion hole 94 on the lock member 9, and the insertion hole 43 of the jacket guide 4, while the head 82b contacts the jacket 3 side of the slid plate 81.

In this configuration, when a driver of the vehicle rotates the operating lever 83 in a locking direction to tighten the clamp bolt 82, the head 82b of the clamp bolt 82 moves in a direction away from the jacket 3 (the left direction in FIG. 7) and comes into pressure contact with the slide plate 81, and the guide surfaces 84 and 85 of the jacket bracket 80 further come into pressure contact with the sheet members 50 and 51 provided on the guide surfaces 45 and 46 of the jacket guide 4. Hence, the jacket bracket 80 is fastened and fixed to the jacket guide 4 and the mount bracket 7. In addition, the upper elastic claws 91 on the lock member 9 are latched on the upper gear lock teeth 81b on the slide plate 81, or alternatively, the lower elastic claws 92 on the lock member 9 are latched on the lower gear lock teeth 81c on the slide plate 81, thereby regulating movement of the jacket 3 in the vertical direction (the tilt direction) or in the axial direction (a telescopic direction).

Moreover, if a so-called half-lock state is caused by the elastic claws 91 and 92 of the lock member 9 contacting the lock tooth peaks of the lock gear teeth 81b and 81c of the slide plate 81 at the time of the locking action, it is still possible to continue the locking action of the operating lever 83 to the end as the elastic claws 91 and 92 are deflected. In this case, regarding the movement of the jacket 3 in the vertical direction (the tilt direction) or in the axial direction (the telescopic direction), the movement in the axial direction (the telescopic direction) is restricted by friction between the elastic claws 91 and 92 on the lock member 9 and the flat surfaces 81d of the gear lock teeth 81b and 81c on the slide plate 81. If the driver bumps into the steering wheel and a load in the axial direction is applied to the steering shaft 2 (in a case of a second collision), the upper elastic claws 91 on the lock member 9 are locked on the upper gear lock teeth 81b on the slide plate 81, or alternatively, the lower elastic claws 92 on the lock member 9 are latched on the lower gear lock teeth 81c on the slide plate 81, as the slide plate 81 slides by way of movement in the axial direction of the steering shaft 2. Hence, the movement in the axial direction of the jacket 3 is restricted.

When the clamp bolt 82 is loosened by rotating the operating lever 83 in an unlocking direction, the head 82b of the clamp bolt 82 moves toward the jacket 3 (the right direction in FIG. 7), thereby fastening and fixation of the jacket bracket 80 is released. At this time, the arms 93 of the lock member 9 elastically bias the jacket bracket 80. Accordingly, the base plate 90 of the lock member 9 recedes from the jacket bracket 80 and the slide plate 81 due to a reactive force, thereby releasing the state of the elastic claws 91 and 92 latched on the lock gear teeth 81*b* and 81*c*. Hence, the jacket 3 can move in the vertical direction and the axial direction. In this way, it is possible to adjust a tilt position and a telescopic position of the steering shaft 2.

According to this embodiment, the elastic claws 91 and 92 are deflected, for example, in the case of the so-called half-lock state caused by the elastic claws 91 and 92 of the lock member 9 contacting the lock tooth peaks of lock gear teeth 81*b* and 81*c* of the slide plate 81 at the time of the locking action of the operating lever 83. Therefore, it is possible to continue the locking action of the operating lever 83 to the end, to regulate the movement of the jacket 3 in the vertical direction (the tilt direction) or in the axial direction (the telescopic direction), and thereby to regulate the movement of the steering shaft 2 reliably.

According to this embodiment, if a driver bumps into the steering wheel and the impact in the axial direction is applied to the steering shaft 2 (in the case of a second collision), any of the claws 91 and the claws 92 on the lock member 9 are latched on any of the lock gear teeth 81*b* or the lock gear teeth 81*c* on the slide plate 81 as the slide plate 81 moves. Hence, the slide plate 81 can deviate from a predetermined position of the jacket bracket 80 and move inside the disengagement groove 80*a* without causing the clamp bolt 82 to move to an end of the telescopic elongated hole 81*a* in the slide plate 81, and thus the steering shaft 2 can move in the axial direction. Therefore, the clamp bolt 82 does not contact the end surface of the telescopic elongated hole 81*a* on the slide plate 81, and it is possible to protect the driver from application of a large impact.

According to this embodiment, the lock member 9 made of the leaf spring is located in the space C between the jacket guide 4 and the jacket bracket 80. Therefore, it is possible to allow reduction in thickness dimensions of the jacket guide 4 and the jacket bracket 80 as compared to a conventional case of providing paired gear tooth portions.

According to this embodiment, the sheet members 50 and 51 provided on the paired tapered guide surfaces 45 and 46 located on both ends of the jacket guide 4 in the vertical direction thereof are used to form sliding sections with the tapered guide surfaces 84 and 85 on the jacket bracket 80. Hence, at the time of the locking action, the paired sheet members 50 and 51 come into pressure contact with the tapered guide surfaces 84 and 85 of the jacket bracket 80 and the lock member 9 can be housed in the space C defined by the small space between the jacket guide 4 and the jacket bracket 80. From this point of view, it is possible to further allow reduction in a thickness dimension of the steering column device in the vehicle width direction.

According to this embodiment, the multiple elastic claws 91 and 92 of the lock member 9 are cut and bent obliquely from the base plate 90 so as to be engaged with the slide plate 81. Moreover, the multiple arms 93 come into pressure contact with the jacket bracket 80 so as to bias the jacket bracket 80. Accordingly, the base plate 90 recedes from the jacket bracket 80 at the time of the unlocking action. In this way, it is possible to release the state of the elastic claws 91 and 92 being latched on the lock gear teeth 81*b* and 81*c*.

According to this embodiment, the positions where any set of the elastic claws 91 and the elastic claws 92 are latched on any of the two rows of lock gear teeth 81*b* and 81*c* formed along the telescopic elongated hole 81*a* of the slide plate 81 are displaced from positions where the other set of the elastic claws are latched on the other set of the lock gear teeth. Therefore, in case of the half-lock state, it is possible to latch any set of the elastic claws 91 and 92 on any set of the lock gear teeth 81*b* and 81*c* of the slide plate 81 by allowing the slide plate 81 to move for a relatively short distance.

The embodiment has exemplified the case in which the fixed member includes the jacket guide 4 while the movable member includes the jacket bracket 80 and the slide plate. Here, the lock member 9 is provided between the jacket guide 4 and the jacket bracket 80 so as to block the movement in the axial direction (the telescopic direction) of the steering shaft 2. However, the present invention is not limited only to this configuration and it is also possible to provide a similar lock member 9 between the mount bracket 7 and the lock mechanism 8 for example so as to block movement in the tilt direction of the steering shaft 2. In this case, the fixed member corresponds to the suspended portion 6 of the mount bracket 7, which is the bracket hanging from the vehicle body and being provided with a tilt elongated hole extending in the vertical direction so as to allow insertion of the clamp bolt 82. Meanwhile, the movable member corresponds either to the jacket guide 4 configured to guide the jacket bracket 80 or to the jacket bracket 80.

The embodiment has exemplified the case of supporting the jacket 3 only on one side by using the jacket bracket 80 and the like. However, the present invention is not limited only to this configuration. Even when the jacket is supported on two sides, it is possible to block relative movement of the movable member by defining a space of a predetermined dimension at a portion different from the portion of friction used for attaching the fixed member to the movable member, and by providing any of the fixed member and the movable member with the lock member and providing the other member with the lock tooth.

The embodiment has exemplified the case in which the lock member 9 includes the leaf spring provided with the elastic claws 91 and 92 to be latched on the lock gear teeth 81*b* and 81*c* on the slide plate 81. However, the present invention is not limited only to this configuration. It is also possible to form the lock gear teeth on the slide plate by using a leaf plate.

Figure 13:
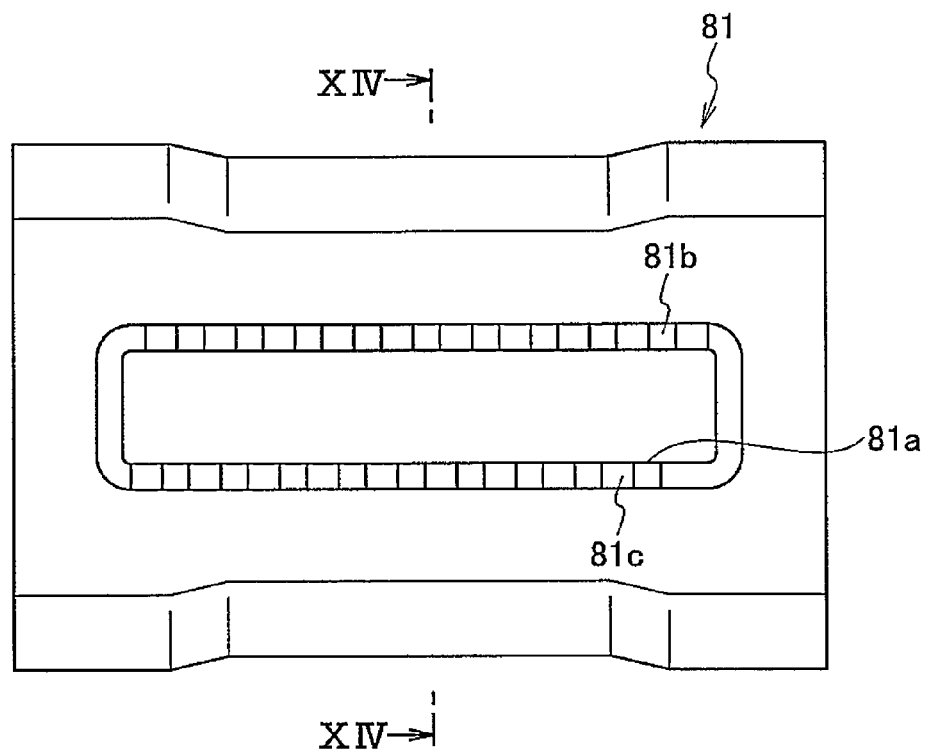
FIG. 13 is a front view of the slide plate of the steering column device according to the embodiment of the present invention.
Figure 14:
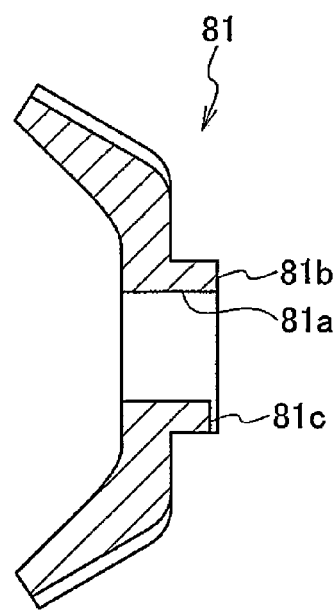
FIG. 14 is a cross-sectional view taken along a XIV-XIV line in FIG. 13.
Figure 15:
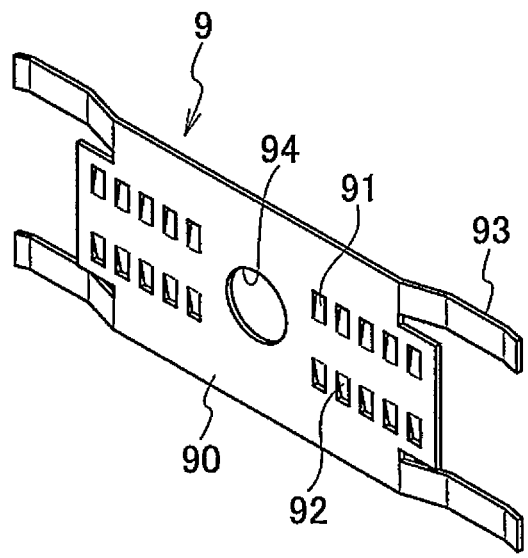
FIG. 15 is a perspective view of the lock member of the steering column device according to the embodiment of the present invention, which is viewed from the jacket guide side.
Figure 16:
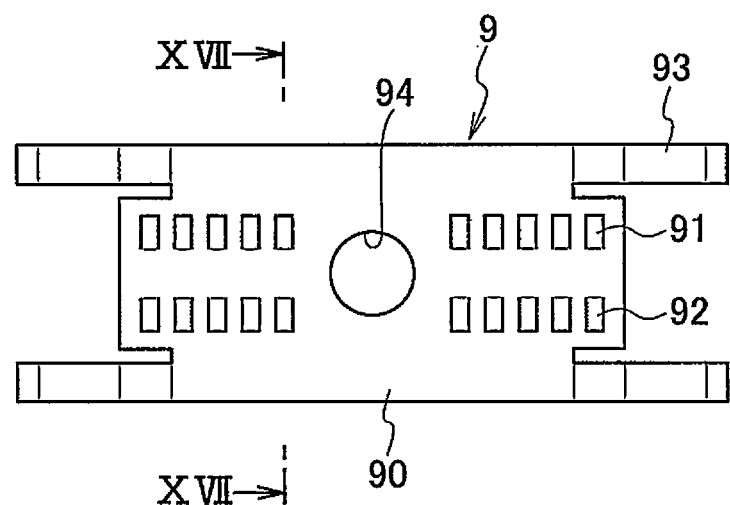
FIG. 16 is a front view of the lock member of the steering column device according to the embodiment of the present invention.
Figure 17:
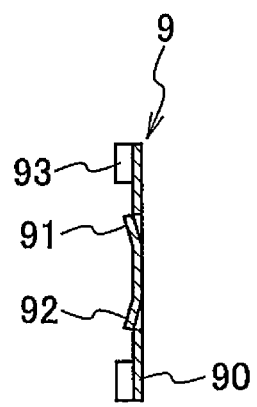
FIG. 17 is a cross-sectional view taken along a XVII-XVII line in FIG. 16.
Figure 18:
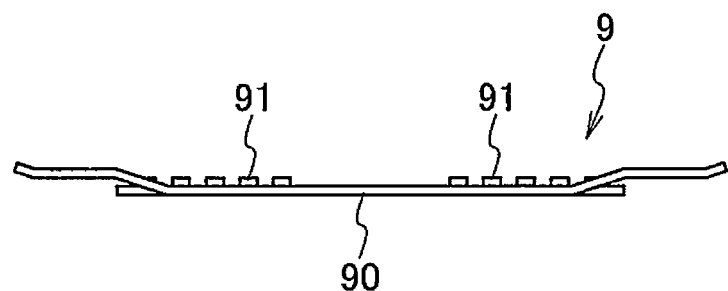
FIG. 18 is a plan view of the lock member of the steering column device according to the embodiment of the present invention.
Figure 19:
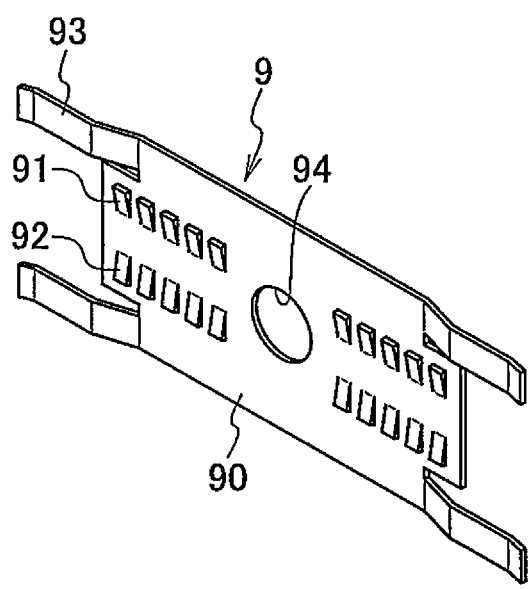
FIG. 19 is a perspective view of the lock member of the steering column device according to the embodiment of the present invention, which is viewed from the jacket bracket side.

The embodiment has exemplified the case in which the lock gear teeth 81*b* and 81*c* are respectively formed along the telescopic elongated hole 81*a* at equal pitches and the positions of the upper lock gear teeth 81*b* are displaced and different from positions of the lower lock gear teeth 81*c* in a lateral direction in FIG. 13. However, the present invention is not limited only to this configuration. The positions in the lateral direction of the upper lock gear teeth and the lower lock gear teeth may be located in mutually similar positions or the number of any set of the lock gear teeth may be increased depending on the load to be applied to the lock gear teeth or on a locking frequency. Moreover, the positions in the lateral direction of the upper lock gear teeth 81*b* and the lower lock gear teeth 81*c* may be located in mutually similar positions, and the positions of the upper elastic claws 91 may be displaced and different from positions of the lower elastic claws 92 in a lateral direction in FIG. 16.

Although the present invention has been described with reference to a certain embodiment, it is to be noted that the invention is not limited only to the embodiment disclosed herein and various modifications are possible without departing from the scope of the invention.

What is claimed is:

1. A steering column device comprising:
   a steering shaft having an upper end in an axial direction of the steering shaft for fixing a steering wheel;

a jacket configured to support the steering shaft rotatably;

a jacket bracket fixed to the jacket;

a mount bracket including a fixation portion to be fixed to a vehicle body and a suspended portion hanging from the fixation portion;

a jacket guide disposed between the jacket bracket and the mount bracket and configured to guide the jacket bracket to be slidable in the axial direction of the steering shaft;

a clamp bolt including a shaft penetrating the mount bracket, the jacket bracket, and the jacket guide; and a slide plate mounted on the jacket bracket and having a telescopic elongated hole extending in the axial direction of the steering shaft for the clamp bolt to be inserted, wherein any one of the jacket guide or the slide plate includes lock teeth, the other one of the jacket guide or the slide plate includes a lock member disposed to face the lock teeth and having elastic claws having elasticity to be engaged with and disengaged from the lock teeth, the jacket guide has a pair of first guide surfaces in two ends of the jacket guide in a vertical direction, the jacket bracket has a pair of second guide surfaces in two ends of the jacket bracket in the vertical direction, the jacket guide and the jacket bracket are capable of being in pressure contact with each other or slidable to each other on the pair of first guide surfaces and the pair of second guide surfaces, the pair of first guide surfaces and the pair of second guide surfaces are spaced apart from each other to define a space between the jacket guide and the jacket bracket, the lock member is located in the space, the lock teeth include first teeth and second teeth formed in two rows, the first and second lock teeth are respectively formed along the telescopic elongated hole at equal pitches, the elastic claws include first elastic claws and second elastic claws formed in two rows, the first and second elastic claws are respectively formed along the telescopic elongated hole, positions of the first lock teeth are displaced from positions of the second lock teeth in the axial direction of the steering shaft, positions where the first elastic claws are locked by the first lock teeth in the axial direction of the steering shaft are displaced from positions where the second elastic claws are locked by the second lock teeth in the axial direction of the steering shaft, and actuation of the clamp bolt by operation of an operating lever makes the jacket bracket and the mount bracket brought into and released from pressure contact with each other to switch between a pressure contact state where the jacket bracket and the mount bracket are in pressure contact with each other with the jacket guide sandwiched therebetween and a non-pressure contact state where the jacket bracket and the mount bracket are not in pressure contact with each other.

2. The steering column device according to claim 1, wherein each of the lock teeth has a flat surface on a peak of the lock teeth, and the lock member is a leaf spring having the elastic claws each protruding obliquely from a base plate and arms configured to come into pressure contact with the jacket bracket.

3. The steering column device according to claim 1, wherein the pair of first guide surfaces and the pair of second guide surfaces are tapered.

4. The steering column device according to claim 1, wherein the slide plate is attached on the jacket bracket toward the jacket.

* * * * *